Dec. 27, 1966 M. MÜLLER 3,294,914

FREQUENCY MULTIPLEX REPEATER STATION HAVING CHANNEL DROP FACILITIES

Filed April 10, 1963

INVENTOR
MARTIN MÜLLER

BY Percy P. Lantzy

ATTORNEY

United States Patent Office 3,294,914

Patented Dec. 27, 1966

3,294,914

FREQUENCY MULTIPLEX REPEATER STATION HAVING CHANNEL DROP FACILITIES

Martin Müller, Pforzheim, Germany, assignor to International Standard Electric Corporation, New York, N.Y., a corporation of Delaware Filed Apr. 10, 1963, Ser. No. 271,986
Claims priority, application Germany, May 4, 1962, St 19,181
16 Claims. (Cl. 179—15)

This invention relates to multiplex repeater stations and more particularly to frequency division multiplex repeater stations having drop-and-insert facilities.

Radio links are known in the prior art employing frequency division multiplex techniques for transmitting a large number of channels of intelligence, such as telephone channels, telegraph and data transmission channels, broadcast sound channels etc., or combinations thereof. As is known a frequency band is assigned to each intelligence channel and these channels frequency modulate a radio frequency carrier. It is the practice in long-distance radio links of this type to incorporate a number of repeater stations between the terminal stations of the links. In the past some of these repeater stations demodulated the received multiplex signal to baseband and then remodulated this baseband signal for transmission to the next repeater or terminal station. However, where high transmission quality is demanded the repeated demodulation and remodulation introduces distortion. Therefore, it has been the practice in certain prior art radio links to maintain the connection from receiver to transmitter within the repeater station in the intermediate frequency region. In other words, the output of the intermediate frequency amplifier of the receiver was connected to the intermediate frequency portion of the transmitter. This type of repeater station involves no problem as long as the entire message is to be transmitted from one terminal station to the other terminal station through a number of repeater stations.

However, where drop-and-insert facilities must be provided, either for communication between the repeater station and a terminal station, or from a branch radio link to one of the terminal stations, a problem arises. How can the signals of a group of channels, for instance, 12 or 16 channels, be dropped at a repeater station and new signals inserted into a corresponding number of channels at the repeater station and yet maintain the remainder of the total number of channels, for instance, 900 channels, at the intermediate frequency? This problem has been solved in the past by what has been termed the "leak-off" technique. With this technique, signals of the group of channels that are to be dropped at a repeater station are detected from the main stream of channels and passed to a load, such as a local receiver or a branch radio link, while signals for communication with a terminal station are inserted into the main stream of channels. This dropping and inserting is accomplished with the main stream of channels at intermediate frequency.

One disadvantage resulting from this "leak-off" technique is that the signals of the channels dropped at the repeater station continue on through the remainder of the repeater stations to the opposite terminal station at full level, thereby requiring at the terminal station equipment to suppress the signals of the dropped channels. Another disadvantage is that to permit the insertion of the signal into the main stream of channels for communication with the originating terminal station it is necessary for the channel spaces receiving the inserted signals to be transmitted from the other terminal station in an empty condition, in other words, without intelligence. A further disadvantage of this type of repeater station is that if communication is desired with both terminal stations double the number of channels, or double the bandwidth must be provided to accommodate this two-way communication from a repeater station. Further, if it is desired to have one repeater station communicate with one terminal station and another repeater station communicate with the other terminal station, a plurality of channels must be reserved in the main stream of channels for each of these repeater stations. Thus, it will be obvious that the "leak-off" technique enables the elimination of distortions which would be produced by demodulation and remodulation in repeater stations, but is uneconomical as far as bandwidth or channel space is concerned.

Therefore, it is an object of this invention to provide a repeater station combining the freedom from distortion of a "leak-off" system and the frequency band economy of a system requiring demodulation and remodulation.

Another object of this invention is to provide a repeater station utilizing substantially the same equipment as employed in a "leak-off" system for demodulation and remodulation and necessitating a minimum of extra equipment to simultaneously obtain freedom from distortion due to repeated demodulation and remodulation and economy of bandwidth.

A feature of this invention is the provision of a repeater terminal for frequency division multiplex systems transmitting a multiplex signal including a plurality of frequency spaced signal channels comprising a receiver for the multiplex signal and a transmitter coupled to the intermediate frequency portion of the receiver for retransmitting the multiplex signal, means coupled to the receiver to remove the signals of given ones of the channels from the multiplex signal, and means coupled to the means to remove to cancel the signals of the given ones of the channels from the multiplex signal in the transmitter.

Another feature of this invention is the provision of a phase inverter means coupled to the output of the means to remove the given ones of the channel signals to reverse the phase of the signals of these dropped channels and apply these phase inverted dropped channel signals to a frequency-modulator coupled to the transmitter oscillator to cancel the signals of the given ones of the channels passed directly from the receiver to the transmitter.

A further feature of this invention is the provision of a gain control arrangement operable upon the phase inverter means to assure complete cancellation of the signals of the dropped channels passed directly from the receiver to the transmitter. The gain control arrangement includes an arrangement operable upon a pilot or reference signal contained in the frequency range of the dropped channels. This reference signal is detected at the output of the channel dropping arrangement at the output of the transmitter and phase compared to provide a control signal proportional to the amplitude of the signals of the given ones of the channels at the output of the transmitter to adjust the gain of the phase inverter means to assure cancellation of the signals of the given ones of the channels in the output of the transmitter.

Still a further feature of this invention is that the signals to be inserted into the given ones of the channels of the multiplex signal are coupled to the frequency-modulator simultaneously with the phase reversed signals at the output of the phase inverter means.

The above-mentioned and other features and objects of this invention will become more apparent by reference to the following description taken in conjunction with the accompanying drawings, in which.

Figure 1:
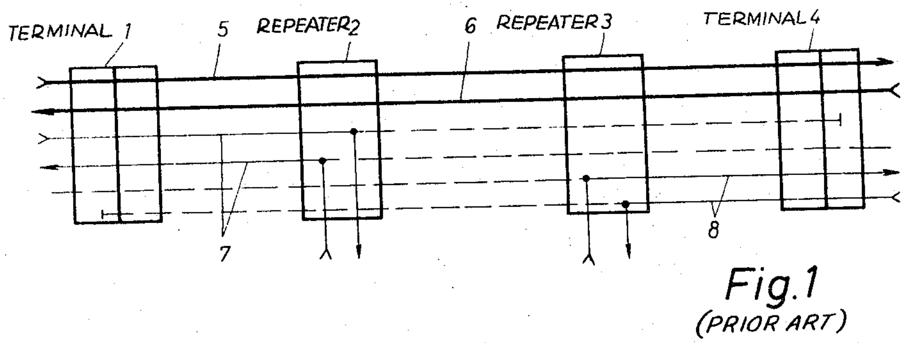
Fig.1 (PRIOR ART)
FIG. 1 is a schematic diagram in block form of a radio link employing the prior art "leak-off" technique to illustrate the improvement obtained by the repeater station of this invention.

Referring to FIG. 1, there is illustrated therein a radio link incorporating repeater stations of the prior art utilizing the "leak-off" technique. The radio link is illustrated as including two terminal stations 1 and 4 and two repeater stations 2 and 3. Heavy solid lines 5 and 6 represent the main multiplex signal for two-way communication between the terminal stations 1 and 4. The main multiplex signals are connected through the repeater stations 2 and 3 in the intermediate frequency range of the radio link without demodulation and remodulation. The reference character 7 indicates diagrammatically that the group of channels which are to be utilized for drop-and-insert facilities at repeater station 2, while the reference character 8 illustrates diagrammatically those channels which are to be utilized for drop-and-insert facilities at repeater station 3. Each of the repeater stations 2 and 3 employ equipment to receive the signals intended therefor including a high quality demodulator which converts all of the intermediate frequency multiplex signals into the baseband. The signals of the group of channels to be dropped at the appropriate repeater station are filtered out of the baseband and then coupled to a load, such as a receiver in the repeater station itself, or a branching radio link. For communication from the repeater station to the terminal station communicating with the repeater station, the local oscillator utilized in the repeater station to convert the multiplex signal from the intermediate frequency range to the radio frequency range is modulated in a well-known manner with the signal to be coupled to the terminal station. This intelligence is carried by an appropriate subcarrier signal to dispose the intelligence signal in the proper channels or frequency bands of the multiplex signal. For modulating purposes in this arrangement there is only required a relatively simple type of modulator because this modulator only needs to be capable of handling the band of signals to be inserted. In this type of repeater station, the signals of the dropped channels are coupled through the repeater station in the main multiplex signal since the mere dropping of the channels does not operate to remove these channels from the main baseband as indicated in FIG. 1 by the dash lines. The signals of the fed-through dropped channels must be suppressed by equipment included in the terminal station. Further, the channel spaces from the terminal station to the inserting repeater station must be kept completely free from external modulation; otherwise, there will be distortion or obscuring of the signal inserted into these frequency channels. If the repeater station is to communicate with both terminal stations, the required bandwidth to be employed must be twice that required for communication with one of the terminal stations and, therefore, for this reason the "leak-off" technique as depicted in FIG. 1 is free from distortions but uneconomical as far as channel space or bandwidth is concerned.

Figure 2:
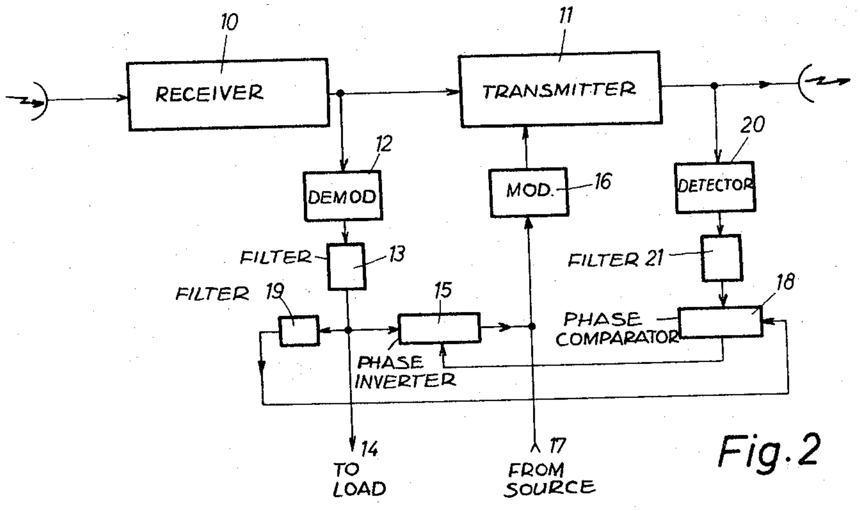
FIG. 2 is a schematic diagram in block form of a repeater station in accordance with the principles of this invention.

Referring to FIG. 2, there is illustrated therein in block diagram form a repeater station in accordance with the principles of this invention for transmission in one direction. For reasons of clarity and because of the complete identity of the equipment required for transmission in the opposite direction, the schematic diagram of the repeater station serving the opposite direction of transmission has not been shown.

In accordance with this invention, and as illustrated in FIG. 2, the repeater station includes a receiver 10 having an output signal therefrom in the intermediate frequency range containing the entire multiplex signal. This output is connected directly to transmitter 11 operating to convert the intermediate frequency signal to a radio frequency signal for transmission to the next repeater station or the terminal station. The intermediate frequency signal is also coupled to demodulator 12 to provide at the output thereof the entire baseband of the transmitted signal. The frequency bands, or selected channels to be dropped at this repeater station are filtered out of the baseband by bandpass filter 13. The output of bandpass filter 13 can then be coupled to a load through output 14, the load being either a speaker or receiving arrangement at the repeater station itself, or the input to a branch radio link. The output from filter 13 is also coupled to phase inverter 15 which operates to phase shift the dropped channel signals 180° and apply the phase-reversed signal to frequency-modulator 16. The output signal of modulator 16 frequency modulates the transmitter oscillator in accordance with the phase-reversed signal. The output of modulator 16 causes the oscillator to produce a signal in phase opposition to the signals of the dropped channels coupled directly to transmitter 11. If the amplitude of the phase-reversed signals of the dropped channels are equal to the signals of the dropped channel fed directly to transmitter 11, cancellation or erasure of the dropped channel signals in transmitter 11 occurs. With this cancellation of the signals of the dropped channels, these channels can now receive new signals. These new signals are coupled from input terminal 17 connected to a source in the repeater station, or to the output of a branch radio link to modulator 16. Thus, with properly selected subcarrier signals, the new signals are inserted into the frequency channels previously occupied by the signals dropped.

In order to obtain a moderate transmission quality in systems using the drop-and-insert repeater station of this invention, such as might be required in an order wire channel, it is sufficient to provide in addition to the erasure or cancellation of modulation of the dropped signal a fixed setting of the amplification of phase inverter 15.

However, where it is required to meet higher transmission qualities, it is necessary to completely erase or cancel the signal of the dropped channels being transmitted from transmitter 11 to obtain an constant high signal-to-noise ratio in the signal being transmitted by transmitter 11. To accomplish this, there is provided, as illustrated in FIG. 2, a gain control loop to control the amplitude of the output of inverter 15 to provide a complete erasure or cancellation of the modulation of the dropped channel in the retransmitted signal. The gain control circuit employs a pilot tone or reference signal carried by the multiplex signal and falling in the bandpass of filter 13. The gain control circuit includes a phase comparator 18 performing a phase comparison between the pilot tone passed by a bandpass filter 19 tuned to the frequency of the pilot tone and the pilot tone appearing at the output of transmitter 11. The pilot tone at the output of transmitter 11 is obtained by detector 20 and a bandpass filter 21 tuned to the pilot tone frequency. The voltage resulting from the phase comparison serves to control the amplitude of the signals added in phase opposition to the signals of the same frequency band connected directly to transmitter 11 from receiver 10, thereby reflecting a complete modulation erasure or cancellation in the channels of the multiplex signal from which the signals were dropped at the repeater station. Detector 20, which is loosely coupled to the output of transmitter 11, may be of minor quality since this detector is only required to derive the pilot tone inserted at the modulating terminal station.

Figure 3:
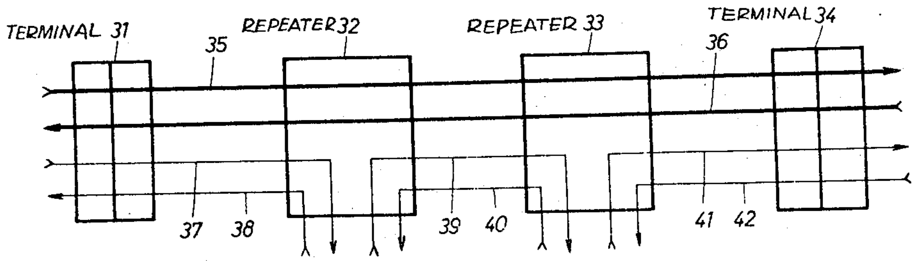
FIG. 3 is a schematic diagram in block form of a radio link including at least two repeater stations of the type illustrated in FIG. 2.

Referring now to FIG. 3, there is illustrated therein a schematic diagram in block form of a radio link comprising two terminal stations 31 and 34 and two repeater stations 32 and 33 incorporating therein the equipment illustrated in FIG. 2. The reference characters 35 and 36 indicate the channels which at all times are transmitted from terminal station to terminal station in a two-way communication system. Reference character 35 indicating the communication from terminal station 31 to terminal station 34 and reference character 36 indicating the communication from terminal station 34 to terminal station 31. With the aid of the components described in connection with FIG. 2, it is possible to utilize part of the frequency band of the multiplex signal or, in other words, a number of frequency spaced channels for communication from station to station by simply adding the new signal to the received and phase shifted signal. In this way, terminal station 31 is connected to repeater station 32 by means of the pair of channels 37 and 38; the two repeater stations 32 and 33 are connected by means of a pair of channels 39 and 40; and the terminal station 34 is connected to the repeater station 33 by the pair of channels 41 and 42. Thus, by incorporating the facilities of the repeater station, as described in connection with FIG. 2, it is possible to fully utilize the complete installed channel length of each channel.

The equipment of the repeater station of this invention, comparable to that employed in a "leak-off" system, that is, the demodulation and signal insertion equipment, is not required to meet any particular high demands or requirements and the necessary additional equipment, such as phase inverter 15, detector 20, filters 19 and 21 and phase comparator 18, are conventional types of circuit arrangements and elements without any extreme design requirements.

While I have described above the principles of my invention in connection with specific apparatus, it is to be clearly understood that the description is made only by way of example and not as a limitation to the scope of my invention as set forth in the objects thereof and in the accompanying claims.

I claim:

1. A repeater terminal for a frequency division multiplex system transmitting a multiplex signal including a plurality of frequency spaced signal channels comprising:
- a receiver for said multiplex signal;
- a transmitter for said multiplex signal coupled to said receiver;
- means coupled to said receiver to remove the signals of given ones of said channels from said multiplex signal; and
- means coupled to said means to remove to cancel said signals of said given ones of said channels from said multiplex signal in said transmitter;
- said means to cancel including
  - a phase inverter means coupled to said means to remove to reverse the phase of said signals of said given ones of said channels; and
  - a frequency modulator coupled between said phase inverter and said transmitter.

2. A repeater terminal for a frequency division multiplex system transmitting a multiplex signal including a plurality of frequency spaced signal channels comprising:
- a receiver for said multiplex signal;
- a transmitter for said multiplex signal coupled to said receiver;
- means coupled to said receiver to remove the signals of given ones of said channels from said multiplex signal; and
- means coupled to said means to remove to cancel said signals of said given ones of said channels from said multiplex signal in said transmitter;
- said means to remove including
  - a demodulator for said multiplex signal coupled to said receiver, and
  - a filter coupled to said demodulator to pass only said signals of said given ones of said channels; and
- said means to cancel including
  - phase inverter means coupled to said filter to reverse the phase of said signals of said given ones of said channels, and
  - a frequency modulator coupled between said phase inverter and said transmitter.

3. A repeater terminal for a frequency division multiplex system transmitting a multiplex signal including a plurality of frequency spaced signal channels comprising:
- a receiver for said multiplex signal;
- a transmitter for said multiplex signal coupled to said receiver;
- means coupled to said receiver to remove the signals of given ones of said channels from said multiplex signal;
- means coupled to said means to remove to cancel said signals of said given ones of said channels from said multiplex signal in said transmitter; and
- means coupled to said transmitter to insert signals into said given ones of said channels;
- said means to cancel including
  - phase inverter means coupled to said means to remove to reverse the phase of said signals of said given ones of said channels; and
  - a frequency modulator coupled between said phase inverter and said transmitter.

4. A repeater terminal according to claim 3, wherein said means to insert is coupled to said modulator.

5. A repeater terminal for a frequency division multiplex system transmitting a multiplex signal including a plurality of frequency spaced signal channels comprising:
- a receiver for said multiplex signal;
- a transmitter for said multiplex signal coupled to said receiver;
- means coupled to said receiver to remove the signals of given ones of said channels from said multiplex signal;
- means coupled to said means to remove to cancel said signals of said given ones of said channels from said multiplex signal in said transmitter; and
- means coupled to said transmitter to insert signals into said given ones of said channels;
- said means to remove includes
  - a demodulator for said multiplex signal coupled to said receiver, and
  - a filter coupled to said demodulator to pass only said signals of said given ones of said channels; and
- said means to cancel including
  - phase inverter means coupled to said filter to reverse the phase of said signals of said given ones of said channels, and
  - a frequency modulator coupled between said phase inverter and said transmitter.

6. A repeater terminal according to claim 5, wherein said means to insert is coupled to said modulator.

7. A repeater terminal for a frequency division multiplex system transmitting a multiplex signal including a plurality of frequency spaced signal channels and a reference signal having a frequency disposed in a predetermined relationship with given ones of said channels comprising:
- a receiver for said multiplex signal;
- a transmitter for said multiplex signal coupled to said receiver;
- means coupled to said receiver to remove the signals of given ones of said channels from said multiplex signal;
- means coupled to said means to remove to cancel said signals of said given ones of said channels from said multiplex signal in said transmitter;
- means coupled to the output of said transmitter and the output of said means to remove responsive to said reference signal to produce a control signal proportional to the amplitude of said signals of said given ones of said channels at the output of said transmitter; and
means coupling said control signal to said means to cancel for adjustment thereof to provide complete cancellation of said signals of said given ones of said channels.

8. A repeater terminal according to claim 7, wherein said means to remove includes
a demodulator for said multiplex signal coupled to said receiver; and
a first filter coupled to said demodulator to pass only said signals of said given ones of said channels.

9. A repeater terminal according to claim 8, wherein said means to produce includes
a second filter coupled to the output of said first filter to pass said reference signal;
detector means coupled to the output of said transmitter to detect said reference signal; and
a phase comparator coupled to the output of said second filter and the output of said detector means to provide said control signal.

10. A repeater terminal according to claim 7, wherein said means to cancel includes
phase inverter means coupled to said means to remove to reverse the phase of said signals of said given ones of said channels; and
a frequency modulator coupled between said phase inverter and said transmitter.

11. A repeater terminal according to claim 7, wherein said means to remove includes
a demodulator for said multiplex signal coupled to said receiver, and
a first filter coupled to said demodulator to pass only said signals of said given ones of said channels; and
said means to cancel includes
phase inverter means coupled to said first filter to reverse the phase of said signals of said given ones of said channels; and
a frequency modulator coupled between said phase inverter and said transmitter.

12. A repeater terminal according to claim 11, wherein said means to produce includes
a second filter coupled to the output of said first filter to pass said reference signal;
detector means coupled to the output of said transmitter to detect said reference signal; and
a phase comparator coupled to the output of said second filter and the output of said detector means to provide said control signal.

13. A repeater terminal for a frequency division multiplex system transmitting a multiplex signal including a plurality of frequency spaced signal channels and a reference signal having a frequency disposed in a predetermined relationship with given ones of said channels comprising:
a receiver for said multiplex signal;
a transmitter for said multiplex signal coupled to said receiver;
means coupled to said receiver to remove the signals of given ones of said channels from said multiplex signal;
means coupled to said means to remove to cancel said signals of said given ones of said channels from said multiplex signal in said transmitter;
means coupled to the output of said transmitter and the output of said means to remove responsive to said reference signal to produce a control signal proportional to the amplitude of said signals of said given ones of said channels at the output of said transmitter;
means coupling said control signal to said means to cancel for adjustment thereof to provide complete cancellation of said signals of said given ones of said channels; and
means coupled to said means to cancel to insert signals into said given ones of said channels.

14. A repeater terminal according to claim 13, wherein said means to remove includes
a demodulator for said multiplex signal coupled to said receiver, and
a first filter coupled to said demodulator to pass only said signals of said given ones of said channels; and
said means to produce includes
a second filter coupled to the output of said first filter to pass said reference signal;
detector means coupled to the output of said transmitter to detect said reference signal; and
a phase comparator coupled to the output of said second filter and the output of said detector means to provide said control signal.

15. A repeater terminal according to claim 13, wherein said means to remove includes
a demodulator for said multiplex signal coupled to said receiver, and
a first filter coupled to said demodulator to pass only said signals of said given ones of said channels; and
said means to cancel includes
phase inverter means coupled to said first filter to reverse the phase of said signals of said given ones of said channels; and
a frequency modulator coupled between said phase inverter and said transmitter; and
said means to produce includes
a second filter coupled to the output of said first filter to pass said reference signal;
detector means coupled to the output of said transmitter to detect said reference signal; and
a phase comparator coupled to the output of said second filter and the output of said detector means to provide said control signal.

16. A repeater terminal according to claim 15, wherein said means to insert is coupled to said modulator.

References Cited by the Examiner

UNITED STATES PATENTS 3,180,938 4/1965 Glomb ------------- 179—15

DAVID G. REDINBAUGH, *Primary Examiner.*
ROBERT L. GRIFFIN, *Examiner.*